United States Patent
Singal et al.

(10) Patent No.: US 12,475,435 B2
(45) Date of Patent: *Nov. 18, 2025

(54) ANTENNA ALIGNMENT FEEDBACK USING NEAR FIELD COMMUNICATION DEVICES

(71) Applicant: Mitek Systems, Inc., San Diego, CA (US)

(72) Inventors: Ashok Singal, San Diego, CA (US); James Treitler, San Diego, CA (US); Sanjay Gupta, Del Mar, CA (US); Michael Ramsbacker, Cardiff, CA (US); Jason L. Gray, La Jolla, CA (US); Michael Hagen, Los Altos, CA (US)

(73) Assignee: Mitek Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,374

(22) Filed: May 10, 2024

(65) Prior Publication Data

US 2024/0296418 A1    Sep. 5, 2024

Related U.S. Application Data

(63) Continuation of application No. 18/180,794, filed on Mar. 8, 2023, now Pat. No. 12,026,670, which is a
(Continued)

(51) Int. Cl.
*G06K 7/10* (2006.01)
*G06Q 10/10* (2023.01)
*G06Q 50/00* (2012.01)

(52) U.S. Cl.
CPC ......... *G06Q 10/10* (2013.01); *G06K 7/10009* (2013.01); *G06K 7/10386* (2013.01); *G06Q 50/00* (2013.01)

(58) Field of Classification Search
CPC .... G06Q 10/10; G06Q 50/00; G06K 7/10009; G06K 7/10386
See application file for complete search history.

(56) References Cited

U.S. PATENT DOCUMENTS 9,106,821 B1 *   8/2015   Baldwin ................. G06T 7/74
9,367,831 B1     6/2016   Besehanic
(Continued)

FOREIGN PATENT DOCUMENTS

EP   1646966 A2   4/2006
EP   1677231 A1   7/2006
(Continued)

OTHER PUBLICATIONS

"Machine Readable Travel Documents Part 11, Security Mechanishs for MRTDS", Doc 9303, International Civil Aviation Organization, Seventh Edition, 2015, 112 pages.
(Continued)

*Primary Examiner* — Aaron W Carter
(74) *Attorney, Agent, or Firm* — Carr & Ferrell LLP

(57) ABSTRACT

Systems and methods for aligning a near field communications (NFC) device and a document having an NFC antenna are disclosed. An exemplary method comprises the steps of accessing a model identifier from the device; associating the model identifier with a device configuration stored in a source; associating the document type of the document with a document configuration stored in the source; generating alignment feedback based on image processing of video of the document produced by the camera of the device; detecting for a data connection between the mobile device and the document; and generating a connection indication when the data connection is detected.

20 Claims, 8 Drawing Sheets

Related U.S. Application Data continuation of application No. 16/917,746, filed on Jun. 30, 2020, now Pat. No. 11,640,582, which is a continuation-in-part of application No. 16/529,293, filed on Aug. 1, 2019, now Pat. No. 10,747,971, which is a continuation of application No. 15/604,372, filed on May 24, 2017, now Pat. No. 10,372,950, which is a continuation of application No. 14/722,058, filed on May 26, 2015, now Pat. No. 9,665,754.

(60) Provisional application No. 62/004,101, filed on May 28, 2014.

(56) References Cited

U.S. PATENT DOCUMENTS

| | | | |
|---|---|---|---|
| 9,369,287 | B1 | 6/2016 | Sarvestani |
| 9,665,754 | B2 | 5/2017 | Hagen |
| 10,372,950 | B2 | 8/2019 | Hagen |
| 10,402,944 | B1 | 9/2019 | Pribble et al. |
| 10,498,401 | B1 | 12/2019 | Rule et al. |
| 10,747,971 | B2 | 8/2020 | Hagen |
| 10,885,514 | B1 | 1/2021 | Hart et al. |
| 11,080,985 | B2 | 8/2021 | Paisson |
| 11,222,342 | B2* | 1/2022 | Rule ................ G06Q 20/322 |
| 11,461,567 | B2 | 10/2022 | Singal et al. |
| 11,640,582 | B2 | 5/2023 | Singal et al. |
| 11,681,883 | B2 | 6/2023 | Singal et al. |
| 12,026,577 | B2 | 7/2024 | Singal et al. |
| 12,026,670 | B2 | 7/2024 | Singal et al. |
| 12,198,215 | B2 | 1/2025 | Gupta et al. |
| 2002/0169721 | A1 | 11/2002 | Cooley et al. |
| 2005/0007236 | A1 | 1/2005 | Lane et al. |
| 2005/0067487 | A1 | 3/2005 | Brundage et al. |
| 2006/0267737 | A1 | 11/2006 | Colby |
| 2006/0274945 | A1 | 12/2006 | Chu et al. |
| 2007/0109101 | A1 | 5/2007 | Colby |
| 2007/0122004 | A1 | 5/2007 | Brown et al. |
| 2007/0200679 | A1 | 8/2007 | Colby |
| 2007/0200680 | A1 | 8/2007 | Colby |
| 2007/0200681 | A1 | 8/2007 | Colby |
| 2007/0200684 | A1 | 8/2007 | Colby |
| 2007/0260886 | A1 | 11/2007 | Dufour |
| 2008/0024271 | A1 | 1/2008 | Oberman et al. |
| 2008/0093447 | A1 | 4/2008 | Johnson et al. |
| 2008/0144947 | A1 | 6/2008 | Alasia et al. |
| 2008/0195858 | A1 | 8/2008 | Nguyen |
| 2008/0211622 | A1 | 9/2008 | Rindtorff et al. |
| 2008/0238681 | A1 | 10/2008 | Rodgers |
| 2008/0279959 | A1 | 11/2008 | Holmes |
| 2009/0154778 | A1 | 6/2009 | Lei et al. |
| 2009/0167934 | A1* | 7/2009 | Gupta ................ H04N 23/633 348/373 |
| 2009/0309704 | A1 | 12/2009 | Chang et al. |
| 2010/0015585 | A1 | 1/2010 | Baker |
| 2010/0052852 | A1 | 3/2010 | Mohanty |
| 2010/0066072 | A1 | 3/2010 | Paeschke et al. |
| 2010/0085257 | A1 | 4/2010 | Kalliola et al. |
| 2010/0150348 | A1 | 6/2010 | Fairbanks et al. |
| 2010/0245034 | A1 | 9/2010 | D'Oliveiro et al. |
| 2010/0263034 | A1 | 10/2010 | Banchelin |
| 2010/0332838 | A1 | 12/2010 | Zhu et al. |
| 2011/0068173 | A1 | 3/2011 | Powers et al. |
| 2011/0156864 | A1 | 6/2011 | Green |
| 2011/0248851 | A1 | 10/2011 | Pham |
| 2011/0309146 | A1 | 12/2011 | Zazzu et al. |
| 2012/0011010 | A1 | 1/2012 | Boulanouar |
| 2012/0139703 | A1 | 6/2012 | Szoke et al. |
| 2012/0154246 | A1 | 6/2012 | Tietke et al. |
| 2012/0155700 | A1 | 6/2012 | Huang |
| 2012/0229872 | A1 | 9/2012 | Dolev |
| 2012/0299709 | A1 | 11/2012 | Nishimura |
| 2013/0012124 | A1 | 1/2013 | Hymel et al. |
| 2013/0084801 | A1 | 4/2013 | Royston et al. |
| 2013/0214898 | A1 | 8/2013 | Pineau et al. |
| 2013/0214902 | A1 | 8/2013 | Pineau et al. |
| 2013/0222119 | A1 | 8/2013 | Tietke et al. |
| 2013/0243266 | A1 | 9/2013 | Lazzouni |
| 2013/0281014 | A1 | 10/2013 | Frankland et al. |
| 2013/0305059 | A1 | 11/2013 | Gormley et al. |
| 2013/0311788 | A1 | 11/2013 | Faher et al. |
| 2014/0002336 | A1 | 1/2014 | Kaine |
| 2014/0009348 | A1 | 1/2014 | Behin |
| 2014/0019768 | A1 | 1/2014 | Pineau et al. |
| 2014/0046954 | A1 | 2/2014 | MacLean et al. |
| 2014/0058951 | A1 | 2/2014 | Kuppuswamy |
| 2014/0065959 | A1 | 3/2014 | Tanaka et al. |
| 2014/0168012 | A1 | 6/2014 | Mankowski et al. |
| 2014/0230039 | A1 | 8/2014 | Prakash et al. |
| 2014/0253297 | A1 | 9/2014 | Kawaguchi et al. |
| 2014/0270400 | A1 | 9/2014 | Natale et al. |
| 2014/0340701 | A1 | 11/2014 | Okamura et al. |
| 2014/0369570 | A1 | 12/2014 | Cheikh et al. |
| 2014/0376050 | A1 | 12/2014 | Baba |
| 2015/0004934 | A1 | 1/2015 | Qian et al. |
| 2015/0088776 | A1 | 3/2015 | Parrish et al. |
| 2015/0170085 | A1 | 6/2015 | Amtrup et al. |
| 2015/0199568 | A1 | 7/2015 | van Deventer et al. |
| 2015/0312879 | A1 | 10/2015 | Lagnado |
| 2015/0347839 | A1 | 12/2015 | Hagen |
| 2016/0104041 | A1 | 4/2016 | Bowers et al. |
| 2016/0119548 | A1 | 4/2016 | Geurts et al. |
| 2016/0162729 | A1 | 6/2016 | Hagen et al. |
| 2016/0210621 | A1 | 7/2016 | Khan |
| 2016/0239657 | A1 | 8/2016 | Loughlin-McHugh et al. |
| 2016/0360348 | A1 | 12/2016 | Ueda |
| 2016/0366294 | A1 | 12/2016 | Uroskin et al. |
| 2017/0156024 | A1 | 6/2017 | Shigaki et al. |
| 2017/0168759 | A1 | 6/2017 | Hirotani et al. |
| 2017/0255800 | A1 | 9/2017 | Hagen |
| 2017/0303262 | A1 | 10/2017 | Yuan et al. |
| 2017/0324750 | A1 | 11/2017 | Khan |
| 2017/0328805 | A1 | 11/2017 | Bermudez et al. |
| 2017/0337403 | A1 | 11/2017 | Ohno |
| 2018/0088186 | A1 | 3/2018 | Bhattacharyya |
| 2018/0092136 | A1 | 3/2018 | Shiobara et al. |
| 2018/0140946 | A1* | 5/2018 | Ueno ................ G07F 17/3211 |
| 2018/0175676 | A1 | 6/2018 | Ikefuji et al. |
| 2018/0189583 | A1 | 7/2018 | Wohlken et al. |
| 2018/0260617 | A1 | 9/2018 | Jones et al. |
| 2018/0278739 | A1 | 9/2018 | Mei |
| 2018/0374383 | A1* | 12/2018 | Thielen ................ G06T 19/006 |
| 2019/0043038 | A1 | 2/2019 | Jang et al. |
| 2019/0139641 | A1* | 5/2019 | Itu ................ G06N 3/045 |
| 2019/0347888 | A1 | 11/2019 | Agbeyo |
| 2019/0354735 | A1 | 11/2019 | Madhusudhana et al. |
| 2019/0354736 | A1 | 11/2019 | Hagen |
| 2020/0195636 | A1 | 6/2020 | Landrock et al. |
| 2020/0249835 | A1 | 8/2020 | Ueno et al. |
| 2020/0334429 | A1 | 10/2020 | Singal et al. |
| 2020/0334430 | A1 | 10/2020 | Gupta et al. |
| 2020/0334431 | A1 | 10/2020 | Singal et al. |
| 2021/0156691 | A1 | 5/2021 | Kozhaya et al. |
| 2021/0240773 | A1 | 8/2021 | Chen et al. |
| 2021/0342840 | A1* | 11/2021 | Rule ................ G06Q 20/326 |
| 2021/0374387 | A1 | 12/2021 | Whitelaw et al. |
| 2022/0076261 | A1* | 3/2022 | Rule ................ G06Q 40/02 |
| 2023/0018280 | A1 | 1/2023 | Singal et al. |
| 2023/0139948 | A1 | 5/2023 | Akashika |
| 2023/0222444 | A1 | 7/2023 | Singal et al. |
| 2023/0259726 | A1 | 8/2023 | Singal et al. |
| 2024/0296418 | A1* | 9/2024 | Singal ................ G06K 7/10386 |
| 2024/0303451 | A1 | 9/2024 | Singal et al. |
| 2025/0104174 | A1 | 3/2025 | Gupta et al. |

FOREIGN PATENT DOCUMENTS

| | | | |
|---|---|---|---|
| EP | 1724707 | A2 | 11/2006 |
| EP | 1755065 | A2 | 2/2007 |
| EP | 1851668 | A2 | 11/2007 |
| EP | 1891607 | B1 | 10/2008 |
| EP | 2073153 | A1 | 6/2009 |
| EP | 2100403 | A2 | 9/2009 |
| EP | 2075726 | B1 | 7/2010 |

(56) References Cited

FOREIGN PATENT DOCUMENTS

| | | |
|---|---|---|
| EP | 2240878 A2 | 10/2010 |
| EP | 2274702 A1 | 1/2011 |
| EP | 1938118 B1 | 5/2012 |
| EP | 2465075 A1 | 6/2012 |
| EP | 2474931 A1 | 7/2012 |
| EP | 2085913 B1 | 8/2012 |
| EP | 2508999 A1 | 10/2012 |
| EP | 2038811 B1 | 1/2013 |
| EP | 2603019 A1 | 6/2013 |
| EP | 2591463 B1 | 10/2014 |
| EP | 2803016 A1 | 11/2014 |
| EP | 2219878 B1 | 3/2015 |
| EP | 2973378 A1 | 1/2016 |
| EP | 2976706 A2 | 1/2016 |
| EP | 3079103 A1 | 10/2016 |
| EP | 3093797 A1 | 11/2016 |
| EP | 3385895 A1 | 10/2018 |
| EP | 3570215 A1 | 11/2019 |
| EP | 2798571 B1 | 4/2020 |
| JP | 2010109594 A | 5/2010 |
| WO | WO2007105720 A1 | 9/2007 |
| WO | WO2013000614 A1 | 1/2013 |
| WO | WO2014025540 A2 | 2/2014 |
| WO | WO2016128568 A1 | 8/2016 |
| WO | WO2016193765 A1 | 12/2016 |
| WO | WO2017207064 A1 | 7/2017 |
| WO | WO2018018175 A1 | 2/2018 |
| WO | WO2018152597 A1 | 8/2018 |
| WO | WO2019002832 A1 | 1/2019 |
| WO | WO2019009685 A1 | 1/2019 |
| WO | WO2019048574 A1 | 3/2019 |
| WO | WO2019089164 A1 | 5/2019 |

OTHER PUBLICATIONS

"Machine Readable Travel Documents (MRTDs): History, Interoperability, and Implementation", Version: Release 1, Draft 1.4, International Civil Aviation Organization, Mar. 23, 2007, pp. 1-60.

Pooters, Ivo, "Keep Out of My Passport: Access Control Mechanisms in E-Passports" in: Technical Report, Jun. 15, 2008, pp. 1-13.

Kinneging, Tom A.F., "PKI for Machine Readable Travel Documents offering ICC Read-Only Access", Version 1.1, international Civil Aviation Organization, Oct. 1, 2004, pp. 1-57.

Wikipedia, "Euclidean Vector", [online], [retrieved on Sep. 30, 2022], Retrieved from the Internet: <URL:https://en.wikipedia.org/wiki/Euclidean_vector>, Revision dated Jun. 12, 2020, 18 pages.

Opposition against European Patent 4008059, filed Aug. 5, 2025 in European Patent No. EP4008059, 27 pages.

EP 4008059 B1 Feature Table filed in Opposition against European Patent 4008059, filed Aug. 5, 2025, 1 page.

* cited by examiner

ANTENNA ALIGNMENT FEEDBACK USING NEAR FIELD COMMUNICATION DEVICES

CROSS-REFERENCE TO RELATED APPLICATIONS

The present utility patent application is a continuation application of and claims priority benefit of U.S. patent application Ser. No. 18/180,794, filed Mar. 8, 2023, which is a continuation application of and claims priority benefit of U.S. patent application Ser. No. 16/917,746 filed Jun. 30, 2020, now granted U.S. Pat. No. 11,640,582 issued on May 2, 2023, which is a continuation-in-part application of and claims priority benefit of U.S. patent application Ser. No. 16/529,293 filed Aug. 1, 2019, now granted U.S. Pat. No. 10,747,971 issued on Aug. 18, 2020, which is a continuation of and claims priority benefit of U.S. patent application Ser. No. 15/604,372, filed May 24, 2017, now granted U.S. Pat. No. 10,372,950 issued on Aug. 6, 2019, which is a continuation of U.S. patent application Ser. No. 14/722,058, filed May 26, 2015, now granted U.S. Pat. No. 9,665,754 issued on May 30, 2017, which is related to and claims priority benefit of U.S. provisional application No. 62/004,101, filed May 28, 2014 under 35 U.S.C. 119 (e). The present utility patent application is related to U.S. patent application Ser. No. 16/917,776 filed Jun. 30, 2020 entitled "Self-Sovereign Identity Systems and Methods for Identification Documents" and U.S. patent application Ser. No. 16/917,832 filed Jun. 30, 2020 entitled "Systems and Methods of Identification Verification Using Hybrid Near-Field Communication and Optical Authentication." The contents of these applications are incorporated herein by reference for all purposes to the extent that such subject matter is not inconsistent herewith or limiting hereof.

TECHNICAL FIELD

The present disclosure relates generally to data processing and, more specifically, to identification (ID) verification using a device with embedded radio-frequency identification (RFID) functionality. Further, to make use of the identification verification technology, reliable means to read the ID are needed. This is especially true for NFC (Near-Field Communication) systems that is a subset of RFID technology. The issue of reading is especially true for readers not designed for specific documents. The NFC reader could have its NFC antenna in an unknown position to a user and the document could have its antenna in another unknown position. This is especially true for non-application specific NFC reading systems. The NFC reader may be an external device that plugs into a desktop or laptop computer or an electronics device designed to read any NFC document. The documents can include identification documents or any document where further validation is desirable. This can include but is not limited to contracts, deeds of trust, and wills. Further, while the current application addresses NFC enabled ID documents and NFC enabled readers based on the standards, the disclosure contemplates future short range communication technologies including the use of other frequencies, protocols, and passive energizing means. Thus, what is needed are method, devices and systems to assist a user in the alignment of an NFC reader's and NFC enabled ID document's antennas to enable communications between the two devices including the transmission of power from the NFC reader to the to the NFC enabled ID document.

BACKGROUND

Use of RFID systems to transfer data has opened new possibilities in computing and business. One such possibility is the use of RFID chips in biometric documents. A biometric document is a combined paper and electronic document (for example, a biometric passport) that contains biometric information and can be used to authenticate the identity of its holder. The RFID chip can be embedded in the front or back cover or center page of the biometric document. RFID enabled systems can read information from documents with embedded RFID chips using contactless technology. The use of RFID enabled ID documents can prevent falsification of ID documents as well as tampering, fraud, and other crimes using false documents.

Additionally, the alignment of the NFC antennas between an active NFC device and an NFC antenna of a passive device is not necessarily obvious and can end up frustrating the user with the possibility of the data connection never being made. Bringing the antennas into alignment is hampered by the facts that the location of the NFC antennas on the mobile device and document are not obvious and that they must be nearly touching for a data connection to be made. What is needed is methods, devices and systems to facilitate placing the two devices in a communications orientation.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Systems and methods for aligning a near field communications (NFC) device and a document having an NFC antenna are disclosed. An exemplary method comprises the steps of accessing a model identifier from the device; associating the model identifier with a device configuration stored in a source; associating the document type of the document with a document configuration stored in the source; generating alignment feedback based on image processing of video of the document produced by the camera of the device; detecting for a data connection between the mobile device and the document; and generating a connection indication when the data connection is detected.

BRIEF DESCRIPTION OF THE DRAWINGS

Embodiments are illustrated by way of example and not limitation in the figures of the accompanying drawings.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Identity verification is important in enabling and securing financial operations, hiring processes, health care, professional services, and so forth. However, ID documents can be tampered with and falsified for fraudulent purposes. To provide an additional protective measure, an RFID chip can be embedded in the ID document. Digital data stored on the RFID chip can duplicate data printed on the ID document. The digital data can be authenticated via Public Key Infrastructure, which makes forgery difficult and expensive. However, conventional digital verification using RFID chip requires special purpose readers.

A system for ID document verification is provided. The system for ID document verification can allow verification of ID documentation having an embedded RFID chip. An image of the ID document can be captured using a camera associated with a client device. The client device can transmit the ID document image to a server for processing for retrieval of printed data represented by the ID document (e.g., holder's name, age, fingerprints, document number, and expiration date). The retrieved data may be sent back to the client device and further to a server. The system for ID document verification residing on the client device may use the retrieved data as a key to unlock the RFID chip and access digital data stored in the RFID chip. The digital data may be transmitted to the server, where the system for ID document verification compares the printed and digital data to determine whether the printed and digital data are identical. Additionally, the system for ID document verification may perform a facial recognition using the printed and digital data. Based on the comparison and/or recognition, similarities between the printed and digital data may be ascertained. Such verification can establish whether printed data in the ID document was altered and whether the ID document is authentic.

In some embodiments, the system for ID document verification can also allow for personal information extraction from a physical ID document.

Figure 1:
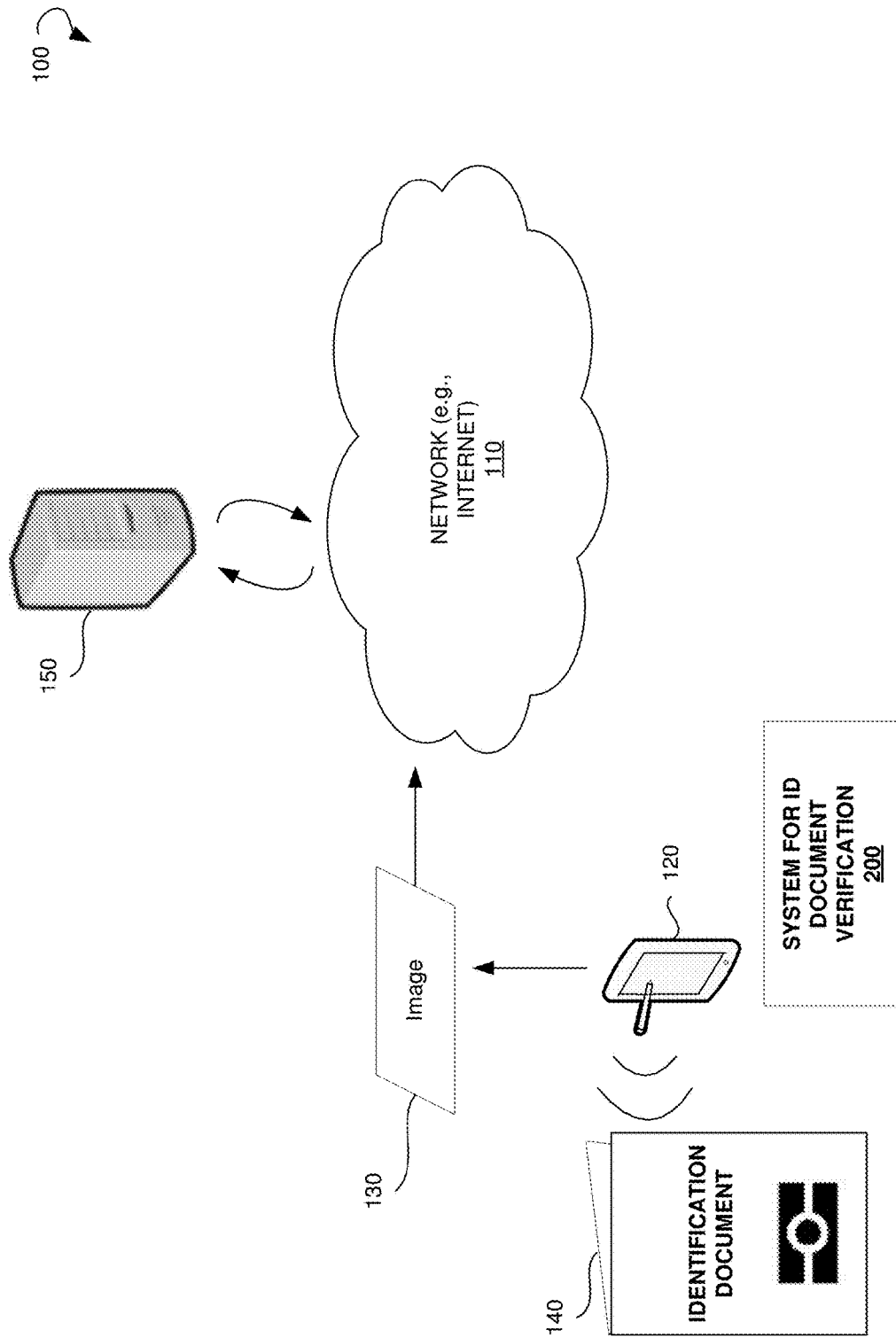
FIG. 1 illustrates an environment within which systems and methods for ID document verification are implemented.

FIG. 1 illustrates an environment 100 within which the systems and methods for ID document verification can be implemented, in accordance with some embodiments. A system 200 for ID document verification may include a server-based distributed application, which may include a central component residing on a server 150 and one or more client applications residing on a client device 120 and communicating with the central component via a network 110. A user may communicate with the system 200 via a client application available through the client device 120. In other embodiments, the system 200 may be a cloud-based application with the central component residing on the server 150 and accessible via a web browser on the client device 120.

The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network (MAN), a Virtual Private Network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network (ISDN) line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System (GPS), cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an infrared port, a Small Computer Systems Interface connection, a Universal Serial Bus (USB) connection or other wired or wireless, digital or analog interface or connection, mesh, or Digi® networking. The network 110 may include a network of data processing nodes that are interconnected for the purpose of data communication. The network may include a Software-defined Networking (SDN). The SDN may include one or more of the above network types. Generally, the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

An ID document 140 can include a document having an embedded RFID chip (for example, a biometric passport, digital passport, government issued ID, drivers' license, and so forth).

To verify the ID document 140, a user can cause the system 200 to capture an image 130 of the ID document 140 by using a camera associated with the client device 120 (a smart phone, a notebook, a personal computer (PC), a tablet PC, or the like). An image 130 associated with the ID document 140 may be transmitted to the server 150 either via a mobile application, a stand-alone web application, or via a fully integrated service (XML, i-frame). The image 130 may be captured by a camera associated with the client device 120, e.g., a phone camera, a tablet PC camera, and so forth. The server 150 may receive and analyze the image 130 to recognize printed data associated with the ID document 140 (for example, issue date, holder's name, age, gender, holder's fingerprint, and so forth). Printed data can be recognized by optical character recognition (OCR).

The results of the printed data analysis can be transmitted back to the client device 120. The client device 120 may scan the RFID chip embedded in the ID document 140 using an RFID reader (or an NFC reader). The RFID reader can be a part of the client device 120 or it can be detachably attached to the client device 120 via one of the ports. Alternatively, the RFID reader can be a stand-alone device and the client device 120 can communicate with it wirelessly (for example, via Bluetooth).

The retrieved printed data can be used as a key to access the digital data on the RFID chip of the ID document 140. By matching the digital and printed data, the system 200 for ID document verification may confirm authenticity of the ID document 140.

Figure 2:
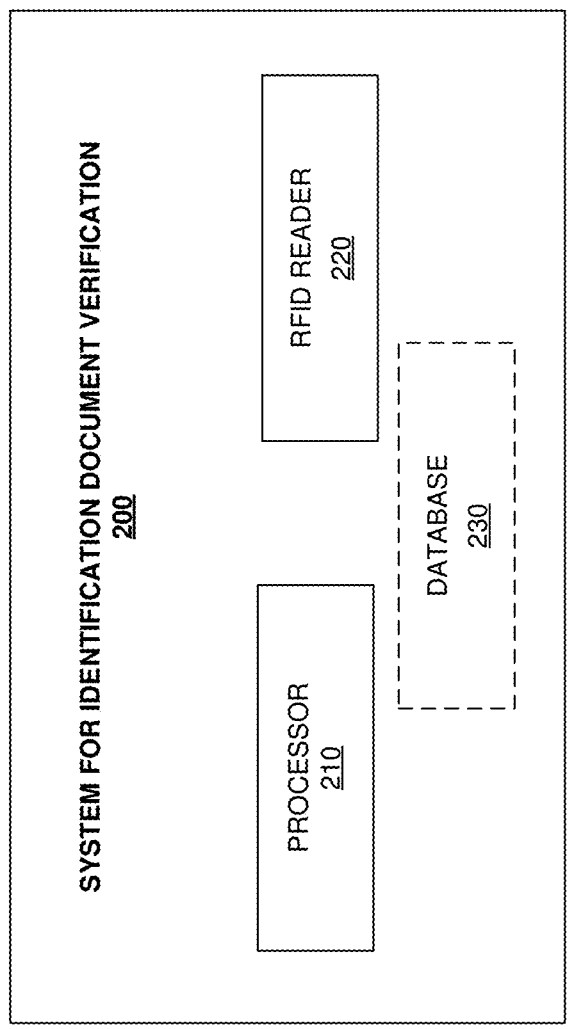
FIG. 2 is a block diagram showing a system for ID document verification.

FIG. 2 shows a detailed block diagram of the system 200 for ID document verification, in accordance with an example embodiment. The system 200 may include a processor 210, an RFID reader 220, and an optional database 230. The processor 210 may be configured to receive an image associated with an ID document. The image may be captured by the camera associated with the client device. The processor 210 may transmit the image to a remote server. The server processes the image using OCR to detect various zones on the image containing data associated with the ID document and a holder of the ID document and extract printed data from the image. The processor 210 may be further configured to receive the extracted printed data from the server. The RFID reader 220 may use the printed data as a key to access the RFID chip of the ID document. In such a way, the RFID reader 220 may retrieve digital data from the RFID chip. The processor 210 may analyze the digital data and match the digital and printed data to check if they are identical. Alternatively, a server may perform the analysis. The server may further perform facial recognition based on photos from the digital data (e.g., RFID passphoto), from the printed data (e.g., passphoto ID), and/or a photo of the user captured by the client device. If the digital and printed data proves identical, the ID document may be verified. If the digital and printed data differ or are absent or nonstandard, the ID document may be refused.

An optional database 230 may be configured to store printed data and digital data as well as verification results.

The processor 210 may comprise, or may be in communication with, media (for example, computer-readable media) that stores instructions that, when executed by the processor 210, cause the processor 210 to perform the elements described herein. Furthermore, the processor 210 may operate any operating system capable of supporting locally executed applications, client-server-based applications, and/or browser or browser-enabled applications.

Figure 3:
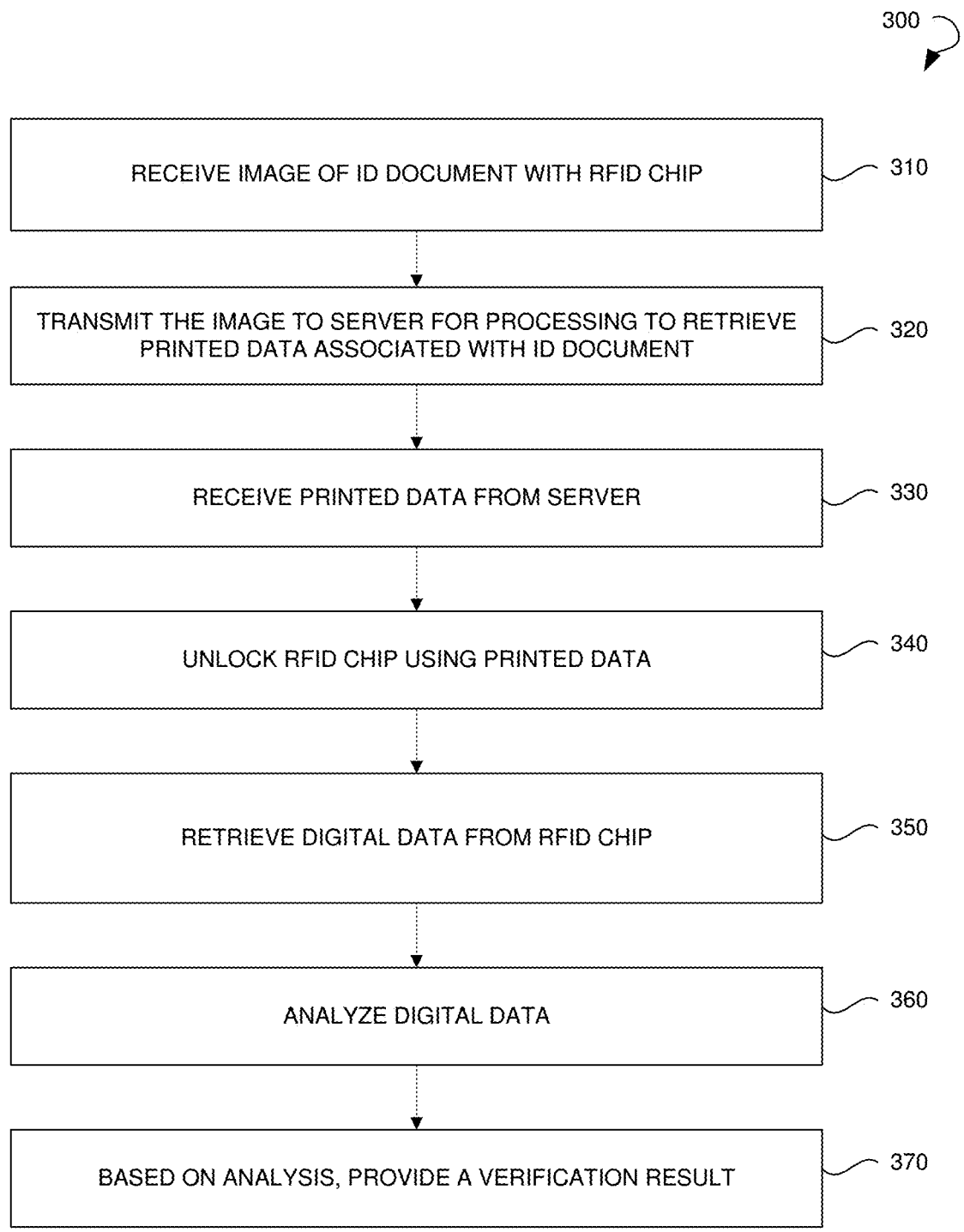
FIG. 3 is a process flow diagram showing a method for ID document verification.

FIG. 3 is a process flow diagram showing a method 300 for ID document verification within the environment described with reference to FIG. 1. The method 300 may commence with receiving an image of an ID document that has an embedded RFID chip at operation 310. The ID document may include a government issued ID, a student ID, an employment ID, a driver's license, a passport, a travel document, and so forth. The received image may include a picture, a scan, and so forth. The image may be captured by a camera associated with the user (for example, a standalone camera; a camera of a user device, such as a smart phone, a PC, a tablet PC; and so forth).

The method 300 may proceed with transmitting the image to a server for processing at operation 320. The processing can include optical character recognition to obtain printed data. The printed data may include holder's name, date of birth, gender, fingerprint, document number, and so forth.

The printed data obtained as a result of processing may be received from the server at operation 330 and used to unlock the RFID chip at operation 340. After unlocking the RFID chip (for example, using any recognized text as a key to access the RFID chip), digital data (or biometric data) stored in the RFID chip may be retrieved at operation 350.

At operation 360, the digital data may be analyzed to check the authenticity of the ID document. The digital data in general duplicates the printed data. By comparing the digital data from the RFID chip and the recognized printed data, the system for ID document verification can ensure that printed data was not altered and the ID document is not forged. Based on the analysis, the system may determine that the digital data and printed data are identical and verify the ID document. Alternatively, according to the analysis, the system may determine one or more evidences of forgery (for example, a difference of the printed data and the digital data, an absence of the digital data, nonstandard digital data, and so forth). On the determining the one or more evidences of forgery, the system may reject the ID document. A verification result may be provided at operation 370.

In some embodiments, data of the verified ID document may be used to automatically populate an electronic form, fields associated with a web resource, and so forth. Thus, filling in forms, may be facilitated and accelerated. Moreover, automatic filling in of electronic forms or blanks allows avoiding mistakes and misprints pertaining to manual entry.

Figure 4:
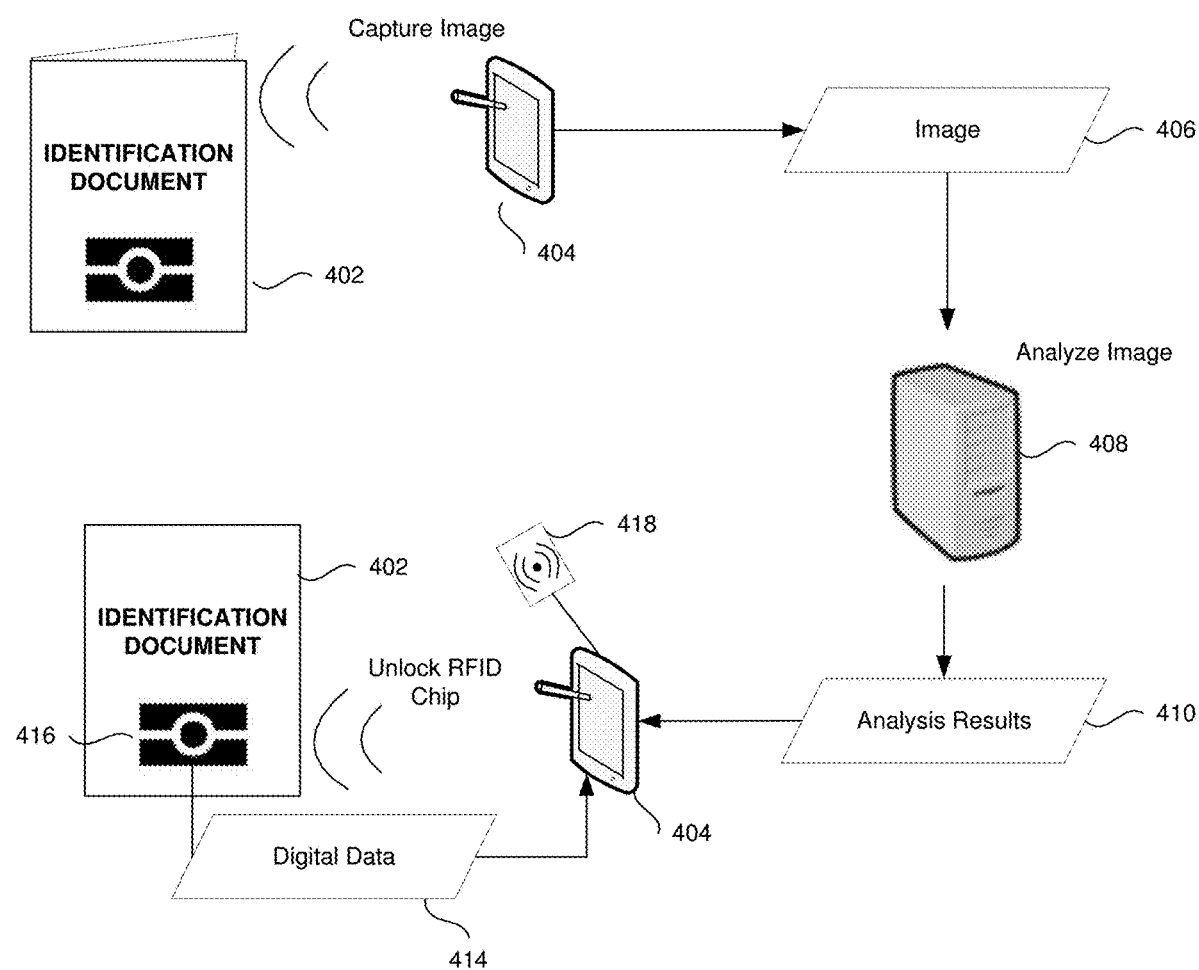
FIG. 4 illustrates accessing digital data related to an ID document.

FIG. 4 illustrates a process 400 of accessing digital data in an RFID chip associated with the ID document, in accordance with some embodiments. A user may capture an image 406 of an ID document 402 using a camera embedded in or connected to a client device 404. The image 406 may be automatically transmitted to a server 408. The image 406 received by the server 408 may be subjected to OCR. Printed information in the image 406 may be analyzed to extract textual and/or other relevant data associated with the ID document 402 and the holder of the ID document 402 (e.g., holder's date of birth, first name, last name, and the like). The results of the analysis 410 can be transmitted back to the client device 404.

The client device 404 can scan an RFID chip 416 in the ID document 402 using an RFID reader 418 (or an NFC reader). The RFID reader 418 can be either embedded in the client device 404 or detachably attached to the client device 404 via a port of the client device 404. The digital data 414 in the RFID chip 416 may be encrypted, so the retrieved printed data can be used as a key to access the digital data 414.

The digital data 414 and printed data can be compared on the client device 404 to verify ID document identity. Additionally, the digital data 414 can be used to fill-in forms, employment forms, medical records, and so forth.

Figure 5:
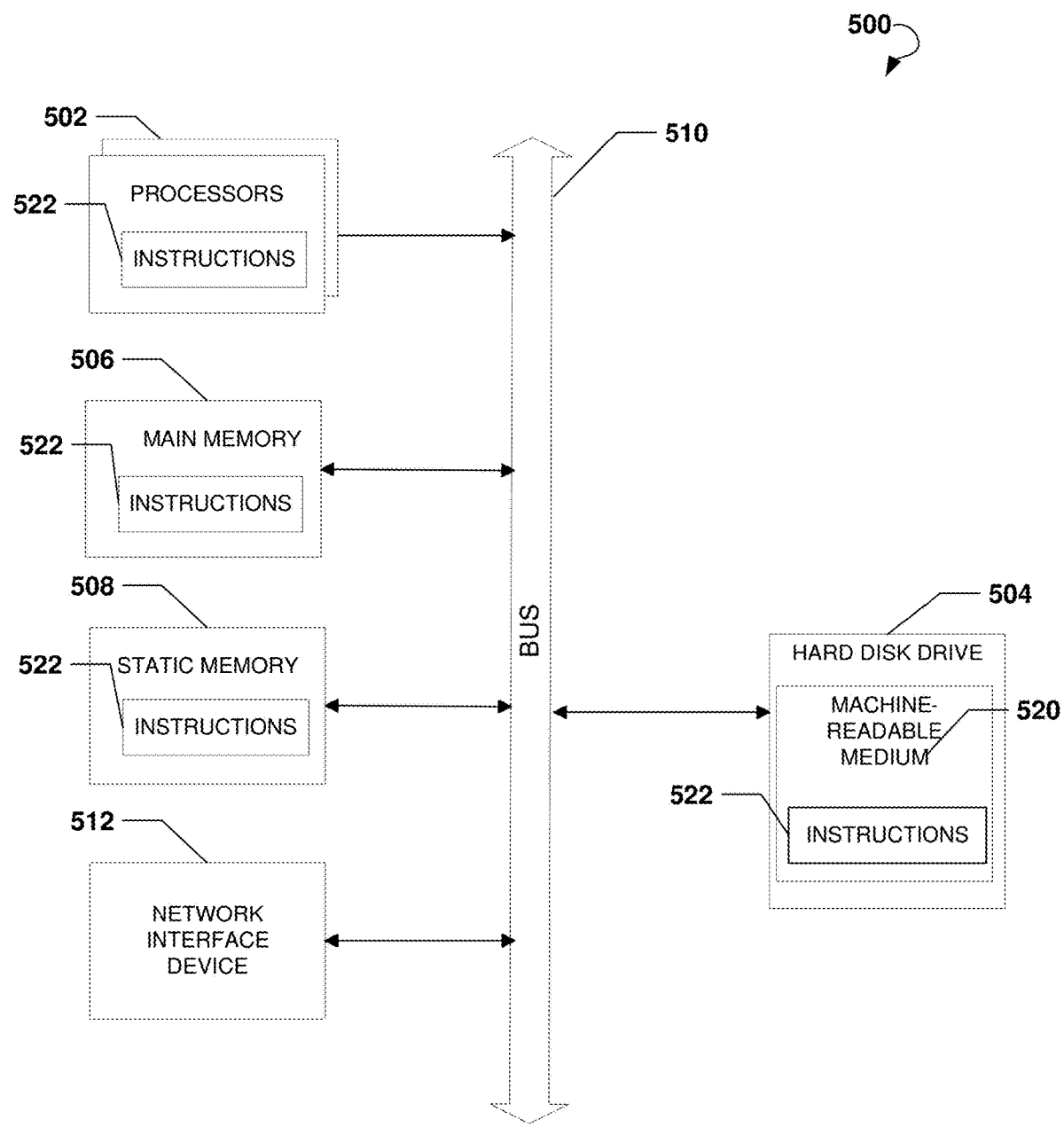
FIG. 5 illustrates a diagrammatic representation of a computing device for a machine in the exemplary electronic form of a computer system, within which a set of instructions for causing the machine to perform any one or more of the methodologies discussed herein can be executed.

FIG. 5 shows a diagrammatic representation of a computing device for a machine in the exemplary electronic form of a computer system 500, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as a Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502, a hard disk drive 504, a main memory 506, and a static memory 508, which communicate with each other via a bus 510. The computer system 500 may also include a network interface device 512. The hard disk drive 504 may include a computer-readable medium 520, which stores one or more sets of instructions 522 embodying or utilized by any one or more of the methodologies or functions described herein. The instructions 522 can also reside, completely or at least partially, within the main memory 506, the static memory 508, and/or within the processors 502 during execution thereof by the computer system 500. The main memory 506 and the processors 502 also constitute machine-readable media.

While the computer-readable medium 520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a Programmable Read-Only Memory (PROM), an Erasable Programmable Read-Only Memory (EPROM), an Electrically Erasable Programmable Read-Only Memory (EEPROM), a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further disclosed herein is technology concerned with systems and methods for aligning NFC antennas of two NFC enabled devices for the purpose of communication between the devices. The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Alignment of the NFC antennas can be a non-obvious task that is necessary to electronically read data from a document by a mobile device. However, user guidance and feedback can be provided by the mobile device to configure the device and align the NFC antennas. The methods disclosed provide feedback for device orientation for antenna alignment and device configuration.

Figure 6:
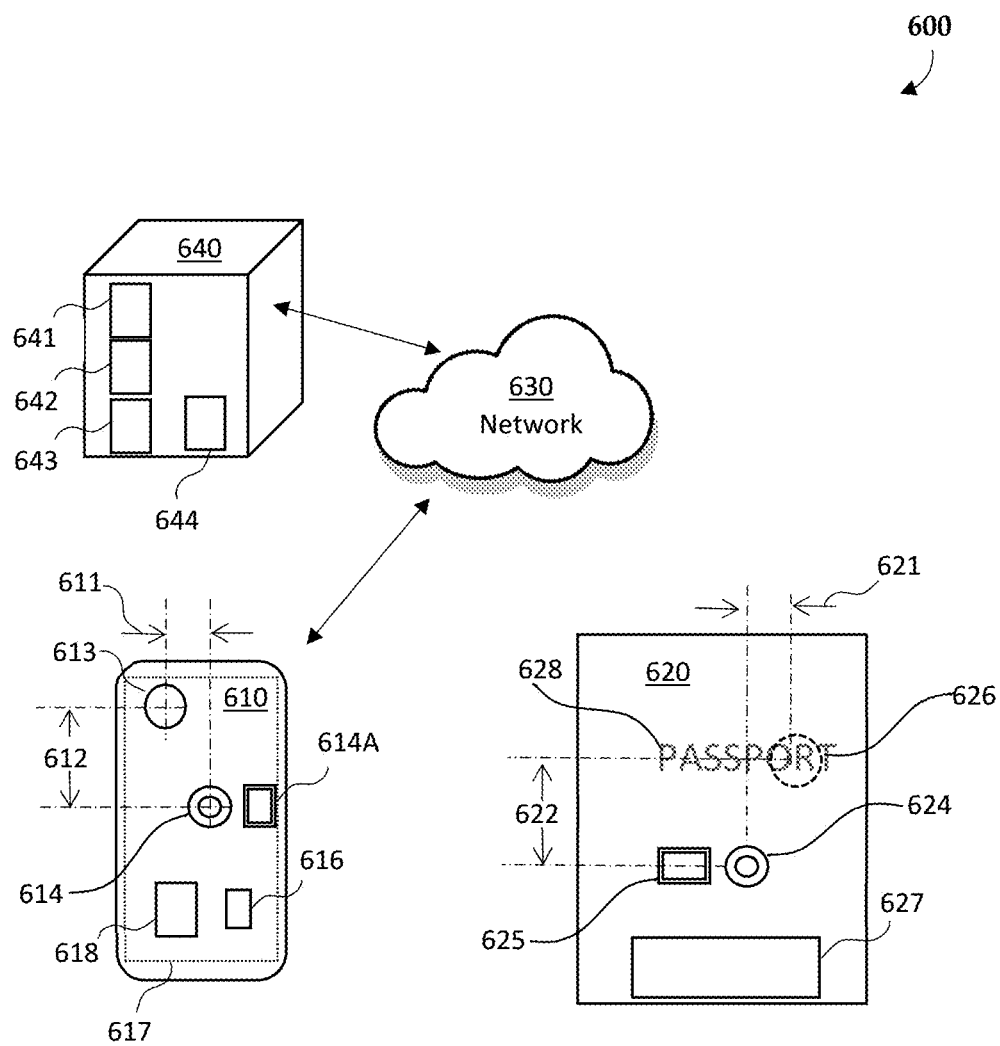
FIG. 6 is a block diagram showing the environment in which the user feedback for the alignment of a mobile device's and document's NFC antenna operates.

FIG. 6 illustrates an environment 600 in which alignment of an NFC enabled mobile device and an NFC enabled document for enabling NFC data communications can be implemented in methods, devices, systems, in accordance with some embodiments. The system can include a mobile device 610, a document 620, a Network 630, and a Server 640. The mobile device 610 is a user electronic device that includes an NFC antenna 614 NFC (also referred to herein as mobile device antenna 614) and NFC electronics 614A configured with the capability to connect to and read data from a document configured with passive NFC electronics. The mobile device 610 configured with the capability to read from a passive document 620 is referred to as an active device. This is because the device generates an electromagnetic field that, when close enough, powers passive NFC electronics 625 on the document 620 through electromagnetic induction and thereby enabling the reading of data off the document 620. The Network 630 can be any suitable wide area network including but not limited to the Internet or cell networks including 3G, 4G, and 5G networks. The Server 640 is a network connected computer and storage that can be configured with mobile device downloadable applications 641, mobile device configuration data 642, user feedback schema information 643, and document configuration data 644 for installation on the mobile device 610.

Alternatively, the environment can include a more generic NFC reader device that is a combination of a computing system as shown in FIG. 5 with NFC electronics 414, 418 in FIG. 4. An example of such a configuration is where active NFC electronics and video camera are connected by a USB or wirelessly to a laptop or desktop computer. As long as the NFC antenna and video camera are configured with a known or ascertainable relationship, and a display coupled to the computer system is configured to display images from the video camera, then the NFC reader device can include configurations other than smart phone or other mobile devices.

Non limiting examples of mobile devices 610 include devices such as smart phones and tablet devices. These devices need to support an active NFC device mode. Further, these devices need to have a means for providing feedback to a user. Smart phones can provide feedback though a variety of feedback sources including but not limited to their user displays, sound and tone generating capability, LEDs, and haptic capabilities.

The document 620 is a physical item including but not limited to a passport, driver's license, or other identity document to which a user desires to make an NFC connection and read data from the document 620. A document 620 is a physical item that contains passive NFC electronics 625 including an NFC antenna 624. The NFC electronics 625 can be co-located with the NFC antenna 624 or separately located. The document 620 contains data which a user can read through a contactless NFC connection between the mobile device 610 and the document 620. In one embodiment, the document is a passive device powered from the mobile device. The power for the NFC electronics 625 is received from the mobile device 610. The emission of an electromagnetic field through an inductive antenna 614 inductively couples to the NFC document's antenna 624 and thereby provides power. However, the disclosure also contemplates the document 620 being an active device. While this is a contactless technology, the two antennas need to be in close proximity. For an NFC device, the communication distance is less than two centimetres.

Non-limiting examples of NFC passive documents include driver licenses, identity cards, passports, credit cards, and physical documents that have NFC electronics and antennas embedded within them. Each of these documents has a known configuration that can include NFC antenna location on a card page, the page number or cover (front or back) on a multi-page document where the NFC antenna can best be accessed, the location of an MRZ (machine readable zone), identifying marks or text that can be found on the document or a combination thereof.

As shown in the example of FIG. 6, the mobile device 610 is a smart phone. The mobile device 610 includes a video camera 613, an NFC antenna 614, the NFC electronics 614A for an active NFC device, on-device storage 616 that can hold configuration information for the mobile device, an alignment feedback schema for the device, and document configuration information. Further, the storage can hold applications for identifying a document type including reading the MRZ (machine readable zone) 627 and generating an alignment feedback schema in accordance with the mobile device type and the document configuration. The electronics for the mobile device functionality including the CPU, memory, and networking electronics for executing applications, providing user feedback, and providing network connectivity are previously described and shown in FIG. 5.

The mobile device and document configuration information in on-device storage 616 can be preconfigured on the mobile device 610 or downloaded over the network 630 from a server 640. Further, the applications 618 on the mobile device 610 can also be preconfigured on the mobile device 610 or downloaded from the server 640.

The video camera 613 can be used to identify the document 620 type and in conjunction with the display 617, guide a user to align the mobile device antenna 614 with the document antenna 624. A mobile device application 618 can process an image or video of the document 620 to identify a document type. Alternatively, the video image can be uploaded over the Network 630 to a Server 640 configured with an application 641 configured to identify the document type. For example, the application 618 might identify a distinguishing feature on the cover of a passport to determine the document type or process its MRZ 627 to determine the document type. Further, the application 618 may control the mobile device 610 to provide an alignment feedback schema according to the mobile device type and the document type to guide a user to bring the mobile device 610 and document 620 within NFC communication distance.

The device configuration information held in on-device storage 616 can include offset data between the video camera 613 and the mobile device NFC antenna 614. This information can be stored as a first offset 611 in the direction of one mobile device 610 dimension and a second offset 612 in a direction perpendicular to the direction of the first offset 611. This information is required to determine a document target 626 on the document 620 because when the mobile device 610 is in or is coming into contact with the document 620, the video camera 613 will be offset from the document antenna 624 so the distance between the video camera 613 and the antenna 614 has to be accounted for.

For each mobile device 610, the offsets can be different and thus the mobile device configuration 616 will contain information of the offset 611, 612 for each mobile device type if the video camera 613 is to be used in the alignment process.

The mobile device configuration information in on-device storage 616 can contain other information including but not limited to the number of cameras on the device, and the strength of the NFC reader, types of haptic feedback supported, LEDs that can be controlled, tone generating capabilities, and accelerometer capabilities.

The document 620 can have one or more of identifying text 628, a shape, or an MRZ (machine readable zone) 627 which can be imaged by the camera 613 and processed by the application 618 to determine a document type. Further, the camera 613 can work in conjunction with an on-device application 618 to provide alignment feedback in accordance with the NFC-document type and the mobile device type.

Figure 7A:
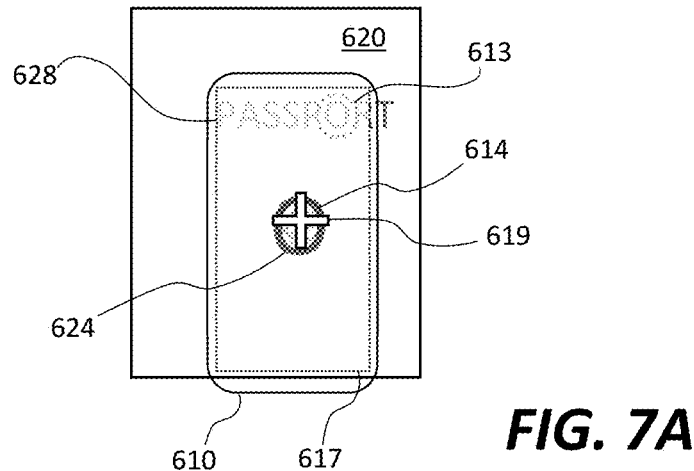
FIG. 7A is a block diagram showing the mobile device and display when the NFC antennas are aligned.

FIG. 7A illustrates the mobile device 610 with the mobile device antenna 614 aligned with the document's NFC antenna 624. The mobile device 610 is oriented with the display 617 away from the document 620, towards a user, and the camera 613 oriented towards the document 620. Because of the offset between the mobile device antenna 614 and the video camera 613, the document target 626 is the letter "O" in the word "PASSPORT" on the document. In one embodiment, an indicator 615 can be overlaid on the display 617 and the user told when the image target 619 centered, and the mobile device 610 brought into contact or close proximity with the document 620 for data connectivity.

The use of the word PASSPORT is only for the purpose of illustration. The target for the camera 613 is selected to compensate for the offset 611, 612 of the camera 613 from the mobile device's 610 NFC antenna 614. For other documents, the document target 626 can be any other word, colored area, corner or edge of the document.

Figure 7B:
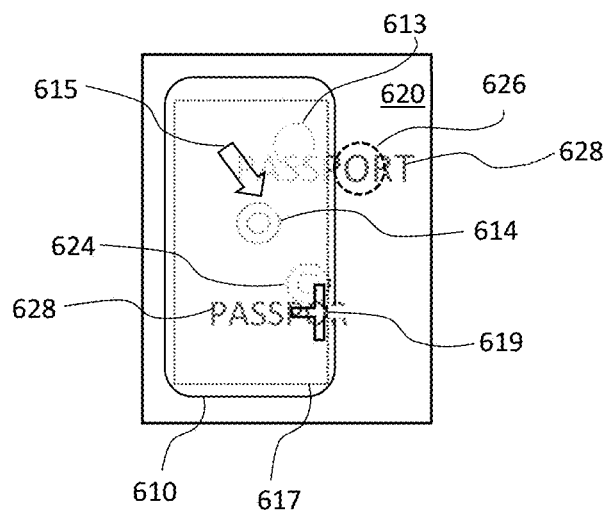
FIG. 7B is a block diagram showing the mobile device and display when the NFC antennas are aligned with user feedback in the direction to move the mobile device.

FIG. 7B illustrates the mobile device 610 and document 620 where the device antenna 614 is not in alignment with the document antenna 624. In this orientation, the document target 626 is not aligned with the video camera 613. Based on the mobile device configuration and the document configuration, when the camera 613 is aligned with the document target 626, then the NFC antennas 614, 624 will be aligned.

On the display 617, there is shown an image target 619. The image target 619 is a graphic overlay on the display 617. In the shown embodiment, the word "PASSPORT" is partially shown on the display 617. As shown, the mobile device 610 is positioned sufficiently above the document for the video camera 613 to focus on the document and be within the video camera 613 field of view. Shown on the display 617 is an arrow indicator 615 providing feedback regarding the direction to move the mobile device for antenna alignment. Other graphics are contemplated including, text, or moving graphics or graphics with audio. Further, the generation of the alignment indicator can include a rotation indication.

Figure 8:
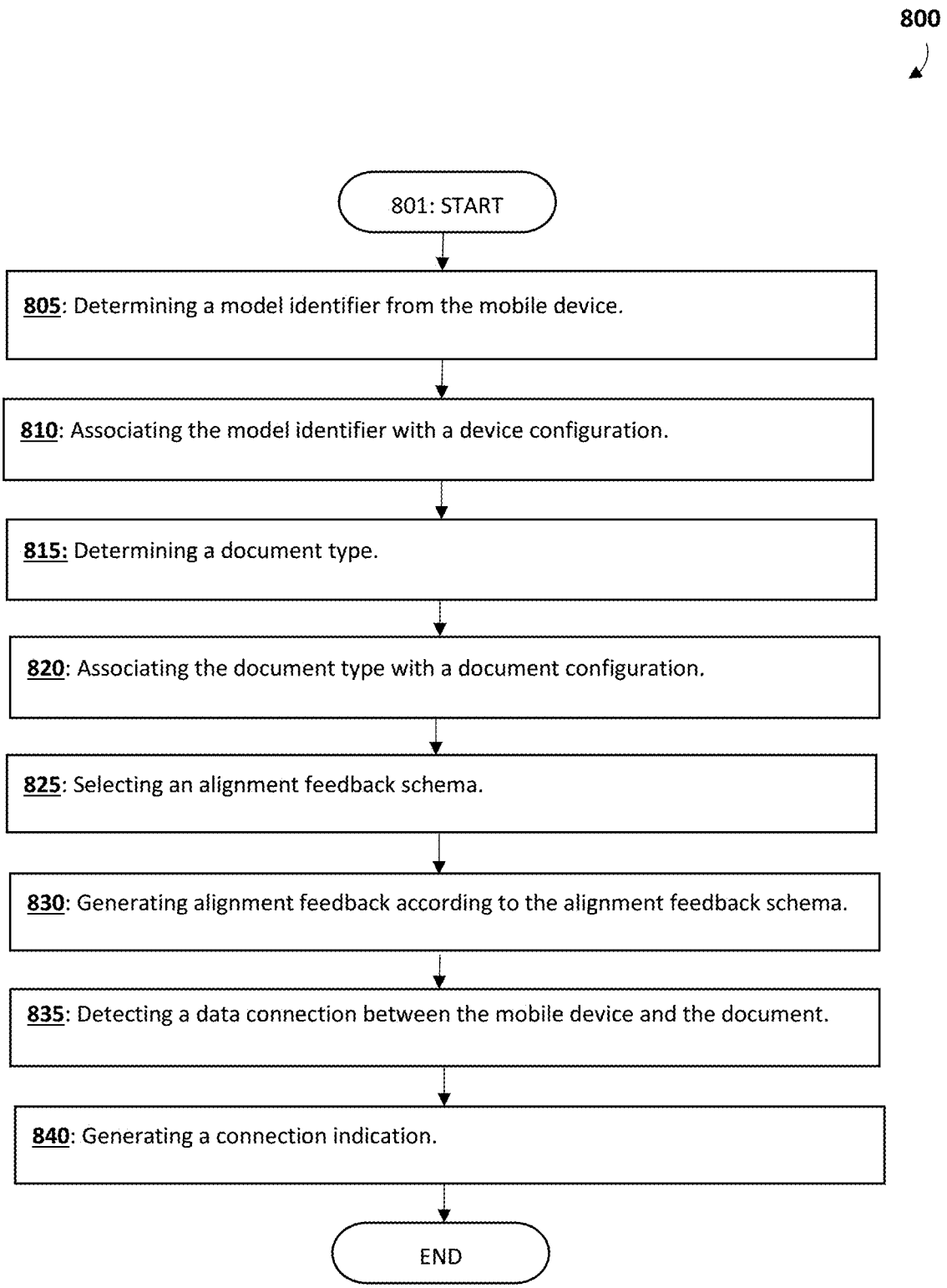
FIG. 8 is a flow chart of the alignment feedback process to align a mobile device with a document to enable NFC communications.

Referring to FIG. 8, a process diagram illustrates an embodiment of a process 800 for aligning a mobile device or a reader device and a document for NFC communications. While the process 800 is described for a mobile device, it is equally applicable for an NFC reader in an environment where a computer system and the active NFC electronics and camera are not integrated into a single device. For example, the NFC electronics and camera could be coupled to the computer system by a USB connection or a wireless connection.

The process starts at 801 where the mobile device application is installed. The installation can include the downloading from the server 640 of an application 641, mobile device configuration 642, schema configuration 643, and document configuration information 644. Further, this step can include the initial configuration of the mobile device including preferences for the alignment user feedback.

In a step 805, the model of the mobile device is identified. The model identifier is a processor readable number, sequence of numbers, or ACII string, or other encoded processor readable string that identifies the model of the mobile device. The model number contains information specific enough to identify a device's configuration including but not limited to the location of the NFC chip. Further, the configuration can identify other useful mobile device features including but not limited to the position of one or more camera lenses on the mobile device, the strength of the NFC reader on the mobile device, audio capabilities, and haptic feedback features. Access to the model identifier can be through an operating system request or reading a hardware memory mapped location. For example, the IOS operating for an Apple iPhone or the Android operating system may have operating system calls to access the phone's model and make.

In step 810, the model identifier is associated with a device configuration in on-device storage 616. The device configurations including mobile device configuration data 642 and the document configurations including document configuration data 644 are stored in a source. This source can be a data structure, table, a database or any other suitable means to store information regarding the device configuration. The source can be located on a Server 640 and accessed when needed or downloaded to the mobile device 610 during the initial configuration of the mobile device 610 and stored in the on-device storage 616, e.g., in non-volatile memory. The device configuration data can include one or more of the following: the position of the NFC antenna on the mobile device 610, the position of one or more of the cameras on the mobile device 610, the strength of the NFC reader on the mobile device, whether the device supports haptic feedback and vibration modes, audio and tone capabilities, and information regarding controllable LED.

Next, the document type is identified 815 so that the location of the document NFC antenna 624 can be located. In one embodiment, the document 620 includes an MRZ (machine readable zone) 627 that can be can optically read by the mobile device 610 and thereby determine the type of the document such as a driver's license, identity card, or a passport. A mobile device software program (application 618) can direct the user to image the document 620 with the video camera. The image is processed to determine the document type. If there is not an MRZ 627 on the document, the application 618 can use image processing techniques or OCR to determine the document type. In one example, the text might say "University of XYZ" which could be used in identifying the document as a University identification card. Associating the document ID with a document configuration 820 would enable a determination of whether the document is NFC enabled and the location of the document NFC antenna.

In another embodiment, the user can enter into the mobile device the document type. This entry can be through a display menu or typed into the mobile device or by utilizing a web browser on the mobile device.

Next an alignment feedback schema is selected 825 based on the mobile device configuration and the document configuration. The use of the alignment feedback schema can include user preferences and be user selectable. One user may prefer display graphics for alignment feedback. Another user may be sight impaired and prefer using tones or audio information for guidance. Further, the alignment feedback schema can be determined by the device configuration of the mobile device. If the device does not have haptic feedback capabilities, then this option will not be included in the feedback schema.

The alignment feedback can be tailored to any of a user's senses or combination of senses. These can include visual, audio, haptic feedback, or a combination thereof. By way of non-limiting examples, visual feedback can include display graphic images and overlays, LEDs on the phone, and camera lights. Graphical images can include pointers on the direction to move, twist, or turn the mobile device or the document to achieve antenna alignment. Further, the graphical images can include moving graphs or a video to familiarize a user on the positioning of the mobile device and the document. The graphics can be to scale and have a realistic appearance.

Using the selected alignment feedback schema, the mobile device generates feedback 830 according to the selected feedback schema. Examples of provided alignment feedback schema are provided below.

In a step 835, the mobile device monitors for a data connection 835 with the document. This can be an event created by the operating system or a query made to the operating system by an application. The mobile device can be configured to download all the data from the document once the connection is made.

In a step 840, a connection indication is generated when the mobile device and the document data connection is made. This indication can be a tone, a graphic, a vibration or other haptic feedback, or a combination thereof. Further, a data transfer completion indication can be generated at the end of the data transfer. Preferably, the data transfer completion indication is different from the connection indication. If the data to be transferred is small, the data transfer completion indication is not needed. But if the data transfer is large, requiring seconds for completion, then the data transfer completion indication is needed.

Thus, computer-implemented methods and systems for identification document verification are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

Operational Example

Different user feedback schemas can be used to assist in the alignment of the mobile device antenna 614 with the document antenna 624 sufficient for data communications. The examples provided below are for illustrative purposes and not intended to limit the scope of the invention.

After installing the application a user starts an application on the mobile device. The application may have been configured with user preferences including a preferred feedback schema using either the display, audio indications, or by haptic feedback means.

The mobile device will then determine its device type through a query to the operating system. Once it knows that it is, for example, a "Make XYZ Model 9" it looks to a device configuration table that contains mobile device configuration information regarding what video cameras the device has, the video camera location, the NFC antenna location, LED control capability, sound and tone generation capability, haptic features, and accelerometer capabilities.

In one embodiment, the user has configured the mobile device to use the display for the alignment feedback schema.

The application may first display message of how the mobile device is to be configured. For example, the message may direct the use to remove any case holding the mobile device. Such case may make NFC operation impossible or overly sensitive. Further, a text overlay message or graphic can be displayed indicating that the document may need to be opened to a specific page.

Next, the user asserts a button starting the process to align the antennas and read the document NFC data. A text message is displayed telling the user to hold the mobile device far enough away from the document to get the entire document within the display. The application starts the video camera which then grabs frames of the video image for processing to find and identify the document. First the process looks for an MRZ within the image. If found, the MRZ is processed and a document type determined. If there is not an MRZ, an image of the document is processed to see if any of the text, logos, or other markings can be extracted and used in the determination of the document type. The document type is then looked up in a table containing document configurations for the document types. The associated document configurations contain the location of the NFC antenna. If for some reason the document type is not found, the mobile device can connect to a server that has the latest document types and document configuration information. If found, the document configuration is transmitted to the mobile device.

For the given example, the document has an MRZ and the application identifies the document as a country XYZ identity card. Using the document configuration data, the location of the document NFC antenna is known. This is combined with location of the mobile device video camera and a document target location is determined.

As a first level of user feedback, a graphic or picture of the orientation of the mobile device and the document can be displayed. This graphic will give a user information about how the mobile device and document should be oriented and a rough idea of their positioning to align the antennas.

Next, the video images are processed to identify the document, the document target location on the document and to overlay on the live video image the image target location. The user could have been previously informed that the overlaid image target should be moved to the center of the display. In another embodiment, an indication can be overlaid on the display showing the direction the phone should be moved for alignment. This indicator can include an indication that either the mobile device or the document should be rotated so that when the mobile device and document are brought together, the NFC antennas are more likely to be aligned.

In one configuration, the indicator will show the direction that the mobile device should be moved for alignment. In another configuration the indication will show the direction in which the image target should move. At the center of the screen there can be an overlay graphic, such as a bullseye showing where the image target should be located.

Once the mobile device is correctly positioned, with the image target centered in the display, a centered indication can be generated. In one configuration this indication can be the flashing of the bullseye, a change of brightness of the bullseye, or a change of color of the bullseye.

The user will then be directed to lower or otherwise bring the mobile device into contact or close proximity with the document. The mobile device, if configured with accelerometers may detect the rotation of the mobile device or movements to the left, right, up, down, while being lowered. Using the accelerometer data, any movement causing misalignment can be calculated and used to generated indications for moving the mobile device while on the document. If the NFC data connection is not made, an indication by either graphic, text, or voice will be given to rotate the mobile device against the document. Alternatively, an indication to move the device in small circles or small rotation until the data connection indication is made.

Once the data connection is made, a graphic or sound is made to signal the user to stop moving the device until the data transfer is complete. The data transfer time can be short, sub second or as long as several seconds. A completion indication can then be generated either on the display or with a sound.

In another configuration, the user has selected audio indicators for feedback. As before, the user asserts a button starting the process to align the antennas and read the document NFC data. A voice message is output to the user to hold the mobile device at least six inches away from the document to get the entire document within the camera view. The application starts the video camera which then grabs frames of the video image for processing to find and identify the document. First the process looks for an MRZ within the image. If found, the MRZ is processed and a document type determined. If there is not an MRZ, an image of the document is processed to see if any of the text, logos, or other markings can be extracted and used in the document type determination. The document type is then looked up in a table of different document types to determine the location of the NFC antenna. As mentioned above, the mobile device can connect to a server that has the latest document types and document configuration information.

Using the same example, the document has an MRZ and the application identifies the document as a country XYZ identity card. Using the document configuration data, the location of the document NFC antenna is known. This is combined with the location of the mobile device video camera, and a document target location is determined. As a first level of user feedback, audio feedback guides a user in the orientation of the mobile device and the document. This audio information gives a user information about how the mobile device and document should be oriented and a coarse idea of their positioning.

Next, the video images are processed to identify the document target location. Audio messages or tones will be given for the orienting and aligning of the mobile device. These can include but are not limited to words "left", "right", "up", "down", "rotate clockwise", and "rotate counter clockwise." In another configuration, a tone can be used to indicate whether the user is getting closer or farther away from aligning the NFC antennas.

Once the mobile device is correctly positioned, a centered audio indication can be generated. In one configuration this centered indication can be a tone of bell or a voice saying "centered". The user will then be directed to lower or otherwise bring the mobile device into contact with the document. Audio directions can be used for this step. The mobile device, if configured with accelerometers may detect the rotation of the mobile device while being lowered. If the NFC data connection is not made, an indication by voice will be given to rotate the mobile device against the document. Alternatively, a voice will indicate to the user to move the device in small circles or small twists until the data connection indication is made.

Once the data connection is made, a sound is made to signal the user to stop moving the device until the data transfer is complete. The data transfer time can be short, sub second or as long as several seconds. A completion indication can then be generated with a tone, bell, or voice indication.

In another example configuration, the user has selected haptic indicators for feedback. As before, the user asserts a button starting the process to align the antennas and read the document NFC data. The user is informed that a first vibration will occur when mobile device at least six inches away and over the document to get the entire document within the camera view. The application starts the video camera which then grabs frames of the video image for processing to find and identify the document. First the process looks for an MRZ within the image. If found, the MRZ is processed and a document type determined. If there is not an MRZ, an image of the document is processed to see if any of the text, logos, or other markings can be extracted and used in the document type determination. The document type is then looked up in a table of different document types to determine the location of the NFC antenna. As mentioned above, the mobile device can connect to a server that has the latest document types and document configuration information.

Using the same example, the document has an MRZ and the application identifies the document as a country XYZ identity card. Using the document configuration data, the location of the document NFC antenna is known. This is combined with the location of the mobile device video camera, and a document target location is determined. As a first level of user feedback, haptic feedback guides a user in the orientation of the mobile device and the document. This text or audio information gives a user information about how the mobile device and document should be oriented and a coarse idea of their positioning.

Next, the video images are processed to identify the document target location. Vibrations will be generated for the orienting and aligning of the mobile device. Vibration strength, if supported by the mobile device, can be used to indicate whether the mobile device is getting closer or farther away from aligning the NFC antennas.

Once the mobile device is correctly positioned, a centered audio indication can be generated. This can be a quick pulsing vibration. The user will then, by the way of text or previously being informed, bring the mobile device contact with the document. The mobile device, if configured with accelerometers may detect the rotation of the mobile device while being lowered. If the NFC data connection is not made, an indication by a low frequency vibration will be given to rotate the mobile device against the document. Alternatively, a different vibration will indicate to the user to move the device in small circles or small twists until the data connection indication is made.

Once the data connection is made, a quick vibration made to signal the user to stop moving the device until the data transfer is complete. The data transfer time can be short, sub second or as long as several seconds. A completion indication can then be generated with a long strong vibration.

What is claimed is:

1. A computer-implemented method for aligning a device and a document of a type having an NFC antenna, the device having a display and a camera operative to capture images and produce video from the images and an NFC reader including an NFC antenna, the method comprising:
   accessing a model identifier from the device;
   associating the model identifier with a device configuration stored in a source, the device configuration including data indicative of a relative location of the NFC antenna of the device;
   associating the type of the document with a document configuration stored in the source, the document configuration including data indicative of a location of the NFC antenna of the document;
   generating alignment feedback based on image processing of the video of the document produced by the camera of the device, the device configuration and the document configuration, the image processing of the video further comprising processing video images of the document to:
   (1) identify the document; and
   (2) identify a location of a document target on the document,
   the alignment feedback including providing guidance to a user for aligning the NFC antenna of the device and the NFC antenna of the document, the aligning of the NFC antenna of the device and the NFC antenna of the document occurring when the camera of the device is aligned with the document target, the location of the document target being different than the location of the NFC antenna of the document;
   detecting for a data connection between the device and the document; and
   generating a connection indication when the data connection is detected.

2. The method of claim 1, wherein the method further comprises installing a mobile device application onto the device.

3. The method of claim 2, wherein installing the mobile device application onto the device further comprises downloading, from a server of the mobile device application, information regarding the device configuration and the document configuration.

4. The method of claim 2, wherein installing the mobile device application onto the device further comprises initializing the device configuration, the device configuration including user preferences for the alignment feedback.

5. The method of claim 1, wherein the source comprises at least one of a data structure, a table, or a database to store information regarding the device configuration.

6. The method of claim 4, wherein the source is accessed when downloaded to the device during initial device configuration and stored in a non-volatile memory of the device.

7. The method of claim 1, wherein the model identifier comprises one of a processor readable number, sequence of numbers, ACII string, or other encoded processor readable string that identifies a model of the device.

8. The method of claim 1, wherein the device configuration further comprises at least one of a position of the camera of the device, a strength indicator of the NFC reader on the device, data on whether the device supports haptic feedback, vibration modes, audio and tone capabilities, and information regarding controllable LED.

9. The method of claim 1, wherein the image processing comprises reading text written on the document to determine the document type.

10. The method of claim 4, wherein the user preferences include a preference for tones or audio information for guidance to be used for the alignment feedback.

11. A system for aligning a mobile device and a document, the mobile device having an NFC antenna and a camera operative to capture images, and the document having an NFC antenna, comprising:
   a processor; and
   a memory for storing executable instructions, the processor executing the instructions to:
   access a model identifier from the device;

associate the model identifier with a device configuration stored in a source, the device configuration including data indicative of a relative location of the NFC antenna of the device;

associate a type of the document with a document configuration stored in the source, the document configuration including data indicative of a location of the NFC antenna of the document;

generate alignment feedback based on image processing of the video of the document produced by the camera of the device, the device configuration and the document configuration, the image processing of the video further comprising processing video images of the document to:
(1) identify the document; and
(2) identify a location of a document target on the document, the alignment feedback including providing guidance to a user for aligning the NFC antenna of the device and the NFC antenna of the document, the aligning of the NFC antenna of the device and the NFC antenna of the document occurring when the camera of the device is aligned with the document target, the location of the document target being different than the location of the NFC antenna of the document;

detect for a data connection between the device and the document; and generate a connection indication when the data connection is detected.

12. The system of claim 11, wherein the processor further executes the instructions to install a mobile device application onto the device.

13. The system of claim 12, wherein the instructions to install the mobile device application onto the device further comprise instructions to download, from a server of the mobile device application, information regarding the device configuration and the document configuration.

14. The system of claim 12, wherein the instructions to install the mobile device application onto the device further comprise instructions to initialize the device configuration, the device configuration including user preferences for the alignment feedback.

15. The system of claim 11, wherein the source comprises at least one of a data structure, a table, or a database to store information regarding the device configuration.

16. The system of claim 15, wherein the source is accessed when downloaded to the device during initial device configuration and stored in a non-volatile memory of the device.

17. The system of claim 11, wherein the model identifier comprises one of a processor readable number, sequence of numbers, ACII string, or other encoded processor readable string that identifies a model of the device.

18. The system of claim 11, wherein the device configuration further comprises at least one of a position of the camera of the device, a strength indicator of an NFC reader on the device, data on whether the device supports haptic feedback, vibration modes, audio and tone capabilities, and information regarding controllable LED.

19. The system of claim 11, wherein the image processing comprises reading text written on the document to determine the document type.

20. The system of claim 14, wherein the user preferences include a preference for tones or audio information for guidance to be used for the alignment feedback.

* * * * *